UNITED STATES PATENT OFFICE.

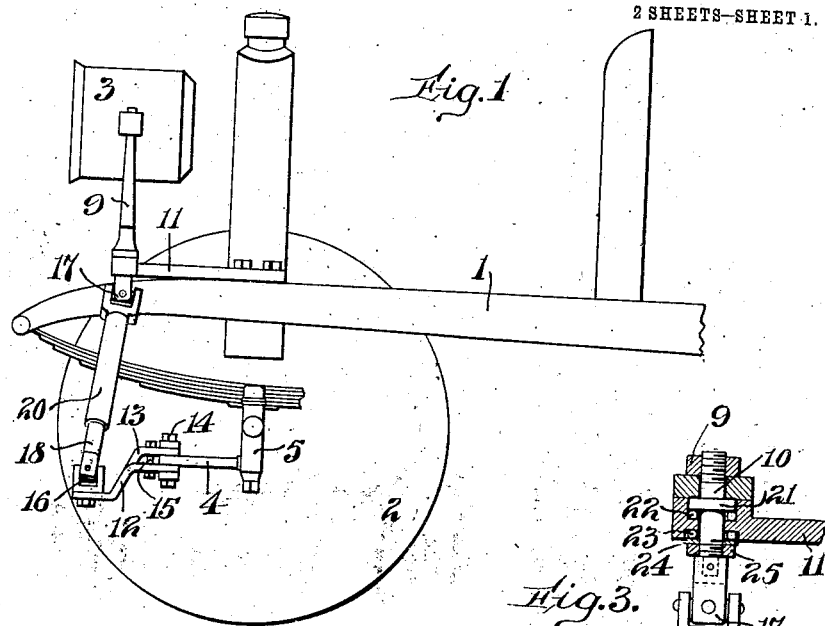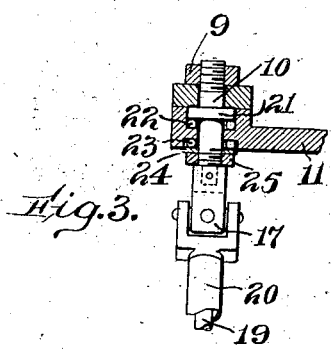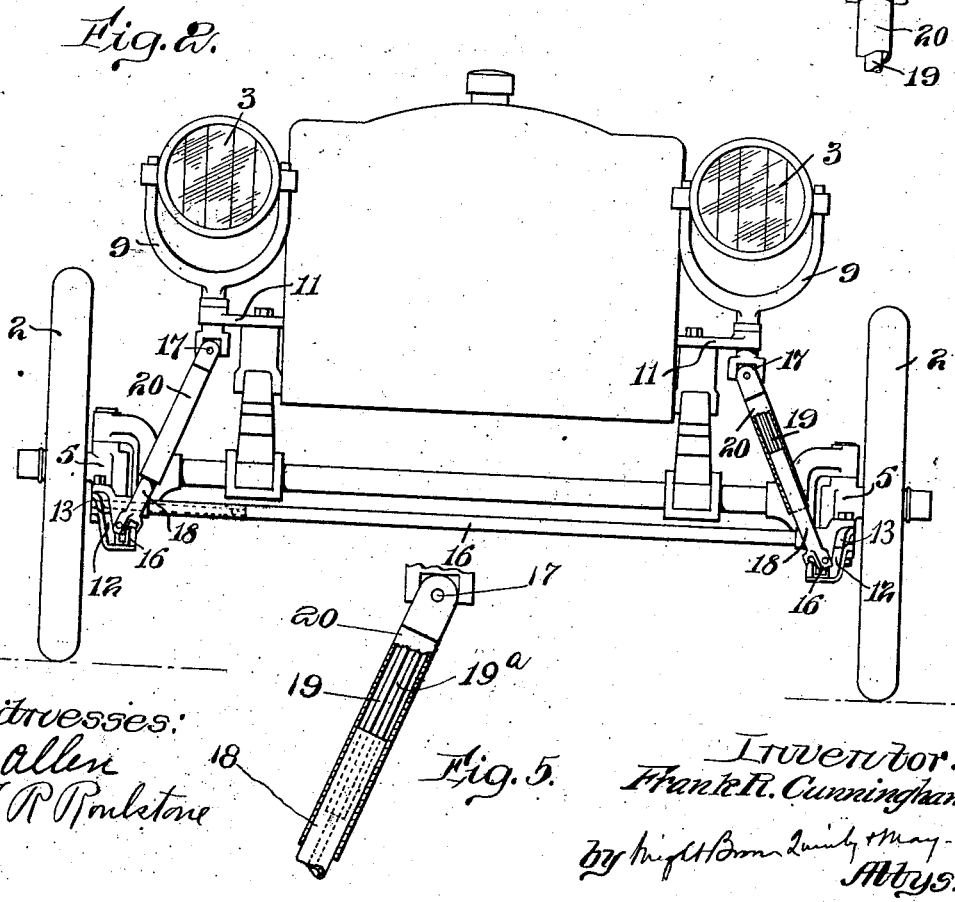

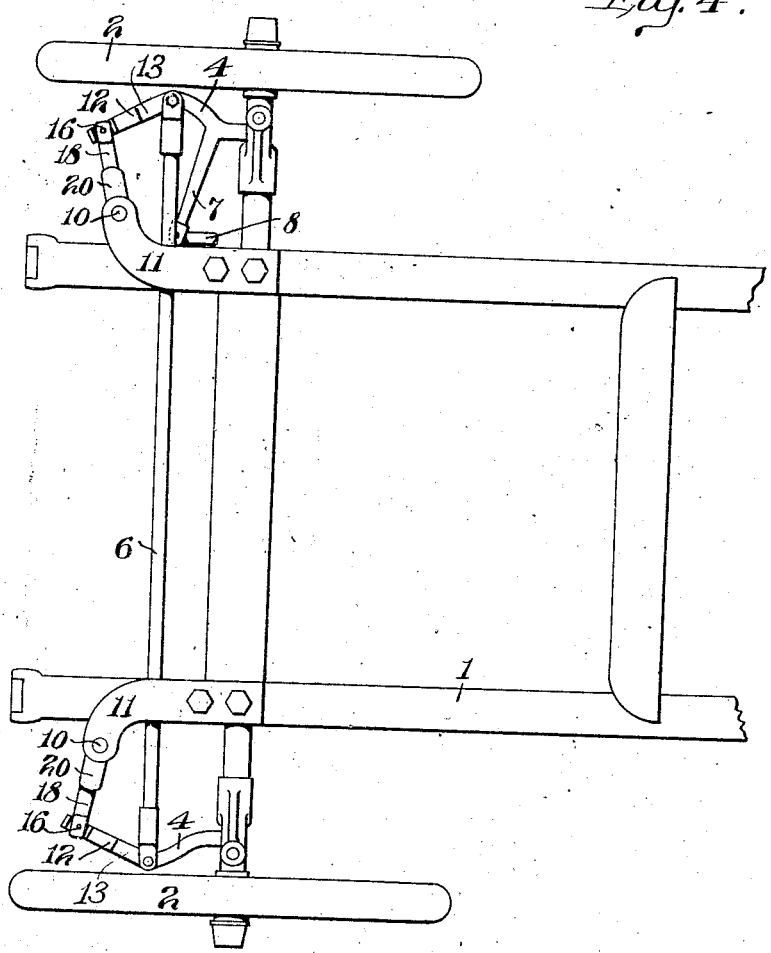

FRANK R. CUNNINGHAM, OF MEDFORD, MASSACHUSETTS, ASSIGNOR TO KENDRICK AND DAVIS COMPANY, OF LEBANON, NEW HAMPSHIRE, A CORPORATION OF NEW HAMPSHIRE.

HEADLIGHT-ADJUSTER.

1,009,385.  Specification of Letters Patent.  Patented Nov. 21, 1911.

Application filed December 7, 1909. Serial No. 531,845.

*To all whom it may concern:*

Be it known that I, FRANK R. CUNNINGHAM, of Medford, in the county of Middlesex and State of Massachusetts, have invented certain new and useful Improvements in Headlight-Adjusters, of which the following is a specification.

This invention relates to a means for adjusting the forward light or lights such as are ordinarily used by motor carriages for illuminating the highway so that when the steering wheels are turned preparatory to driving the carriage around corners or bends, the headlights may be correspondingly turned to illuminate the road into which the carriage is about to turn before the latter has actually been swung in the new direction. That is, when an automobile is equipped with headlights which are fixed in direction with respect to the body of the automobile, they will not illuminate a branch road or turn until after the automobile has been turned into the same, so that until the carriage has actually been turned the road or bend remains in darkness. As a means of preventing accidents at night it is, of course, highly desirable that the road or path which the carriage is to follow due to any sidewise adjustment of the steering wheels should be illuminated before the carriage has actually diverged from its previous direction of motion in order that obstacles or the like may be discovered in time.

Accordingly the object of my invention is to provide in connection with the motor vehicle and the headlights thereof a simple form of adjusting means connected with the steering wheels for giving lateral movements to the headlights equal to and simultaneously with the lateral steering movements of the steering wheels, whereby the path which the carriage is to follow in consequence of such deviation of the steering wheels is immediately illuminated.

The invention therefore consists in a novel connection between the steering mechanism and the headlight or lights which will permit the necessary range of lateral steering movement of the wheels and will also communicate the exact amount of such angular movement to the headlights.

In the accompanying drawings I have illustrated a mechanism which exemplifies the preferred embodiment of my invention.

Figure 1 represents as much of the forward end of the motor carriage as is necessary to illustrate the application of my invention, together with the connections in which the invention is embodied. Fig. 2 is a front view of the same. Fig. 3 is a detailed view showing in section the manner of mounting the headlight or lantern. Fig. 4 is a plan view of the parts shown in Figs. 1 and 2. Fig. 5 is a detail elevation, partly in section, of one of the lamp-turning rods.

The same reference characters indicate the same parts in all the figures.

Referring to the drawings the reference character 1 designates the forward part of the frame of an automobile or other motor carriage.

2 designates the steering wheels of the same, which in this instance are the front wheels as usual.

3 designates the headlights or search lights of which there are usually two, arranged on each side of the front of the carriage.

The steering wheels are mounted in any approved or ordinary manner so that they may be oscillated laterally by any of the steering gears in common use or adaptable for the purpose. The means for oscillating the wheels shown here consists of levers 4 fastened to the pivoted holders 5 of the wheel drivers and connected with each other by a bar 6. One of the levers 4 has an arm 7 receiving motion from the steering device through a rod 8.

The headlights 3 are secured to forks 9 having shanks 10 which are rotatably mounted in brackets 11 secured to the frame 1 and constitute pivots or pivotal attachments for the headlights. The rotative engagement between the brackets and lamp-holders enables the latter to be turned from side to side. Such turning movement is given by the steering mechanism through rods which are pivotally connected both with the lamp-holders and the steering mechanism. The connection of the rods with the steering mechanism consists of arms 12 secured to the levers 4, with which arms are associated clamps 13, the ends of such arms and clamps embracing the adjacent lever 4, and having orifices to receive perforated bosses on the upper and lower sides of the lever. At each end of the rod 6 a pin or bolt 14, which connects the rod 6 to the corresponding lever, passes through the perforation in the embossed lever and through the arm 12 and clamp 13 associated therewith, which are also additionally secured together by a clamping bolt 15. This construction is employed in order to attach the apparatus to a carriage already completed.

A manufacturer putting out carriages equipped with the headlight adjuster would make the arm 12 in one piece with the lever 4. The lower end of the rod is connected to the outer arm 12 by a universal joint 16, and its upper end is connected with the shank pivot of the lamp-holder by a universal joint 17. By virtue of these joints the angular movement of the wheel about its vertical axis is communicated in the same degree to the lamp independently of the linear movement of the connection between the rod and the arm 12. The intermediate rod is variable in length owing to the fact that the axes of horizontal oscillation of the wheel and lamp-holder are out of line, and in order to permit the necessary travel of the projecting end of arm 12. For this purpose the rod is made in two parts 18 and 19, which are connected respectively to the universal joints 16 and 17 and one of which slides longitudinally within the other in the manner of the parts of a telescope. These parts are prevented from rotating independently of each other by any suitable means, such as a groove 19ª on one part and a key on the other, or by making the part 19 of prismatic form and fitting it in a correspondingly shaped hole in the member 18. To the part 19 is secured an outer tube 20 which surrounds the part 18 and acts as a dust guard to exclude dust and grit from the inner member 19 of the telescopic rod.

It is to be noted that the oscillation of the lamp is due wholly to the rotation or oscillation of the telescopic rod about its own axis, due to the angular movement of the arm 12, and transmitted to the rod by the universal joint 16, and is not due in the least to the linear movement of that end of the rod which is connected to the arm 12. That is, as the arm 12 is oscillated when the steering wheel is turned to right or left, the angular position of the pivot connecting the universal joint 16 with the arm 12 is correspondingly changed, and this angular variation is transmitted to the telescopic rod in the form of rotary movement of the latter about its own axis. The same degree of rotary movement is transmitted through the universal joint 17 to the lamp-holder, and in consequence thereof the lamp is oscillated in the same direction as the steering wheel and through the same angle. Owing to the universal couplings at both ends of the telescopic rod, the angular movement of the lamp-holder is independent of the linear movement of that end of the rod which is connected to the swinging arm 12, and thus the device herein shown is entirely independent of the length of the arm 12, or of the combined length of the arms 12 and 4, and can be applied to any vehicle. The telescopic rod might be connected to the wheel-holder 5 at the pivoted axis of the latter with like effect, as far as transmitting oscillations to the lamp-holder is concerned, but for purposes of construction, it is more convenient to connect the rod to an arm extending from the wheel-holder. On account of the fact that the rod is so connected at one end to an arm and that its other end is connected to the lamp-holder at the axis of the latter, which is not in line with the axis of oscillation of the wheel-holder, it is necessary to make the rod variable in length.

In order to secure freedom from looseness of the lamp-holder, and also to permit the latter to turn readily, it is provided with ball bearings at the point where it is mounted in the bracket 11. Thus a shoulder 21 of the lamp-holding stud or shank 10 rests upon a series of balls 22 contained in a socket in the upper side of the bracket 11. A second set of balls 23 is contained in a socket in the under side of the bracket and supported by a washer 24 and a nut 25 screwed upon the stud 10. Adjustment of this nut enables all looseness in the bearing of the lamp-holder to be taken up without binding the latter to such an extent as to prevent its free oscillative movement.

I claim—

1. In combination with a motor vehicle and the laterally movable steering wheels thereof, a lamp mounted with provision for horizontal oscillative movement, an arm connected with one of said wheels so as to have lateral angular movements similar thereto, and an intermediate connecting rod having universal pivotal connection with said arm and a universal pivotal connection with said lamp at a point in line with the axis of oscillative movement of the lamp, whereby it is rotated about its own axis by angular movements of said arm and transmits such rotation to the lamp.

2. In combination with a motor vehicle, a steering road wheel mounted with provision for oscillative movement about a vertical axis, a lamp secured to said vehicle with provision for oscillative movement about a vertical axis and a connecting rod connected at its ends with said lamp and said wheel respectively, and oscillatable about its own axis so as to communicate equal degrees of lateral angular movement from said wheel to said lamp.

3. In combination with a vehicle a steering road wheel having a connection with said vehicle such as to permit angular movements thereof in a general horizontal direction, a lantern mounted upon the frame of said vehicle independently of said wheel and movable oscillatively also about an upright axis, and a rod having universal pivotal connection with said wheel and with said lamp for transmitting equal angular movements from the wheel to the lamp independently of any linear movement of either end of the rod.

4. In combination with a vehicle a steering road wheel connected therewith and movable oscillatively in a general horizontal direction, a lamp pivotally attached to said vehicle and also movable oscillatively, an arm connected with said wheel and having the same oscillative movements as the latter, and an extensible rod pivotally connected by means of universal joints with said arm and with said lamp-holder at a point in line with its pivotal attachment, whereby to transmit the angular movement of the arm to the lamp.

5. In combination with a vehicle a steering wheel, a holder to which said wheel is connected mounted with provision for horizontal oscillative movement, an arm projecting from said holder, a lamp-holder independently mounted with provision for horizontal oscillative movement, and a connecting rod of variable length having a universal connection with said arm and with said lamp-holder so as to permit linear movement of the arm and transmit angular movements thereof to said lamp-holder.

6. In combination with a vehicle a steering wheel, a holder to which said wheel is connected mounted with provision for horizontal oscillative movement, an arm projecting from said holder, a lamp-holder independently mounted with provision for horizontal oscillative movement, and a connecting rod consisting of two parts, one of which slides telescopically within the other, one of said parts being attached by a universal pivotal connection with said arm and the other part being similarly attached to said lamp-holder, and an outer tube mounted upon the inner part of said rod and surrounding the other part thereof to exclude dust from the telescopic joint.

7. In combination with a vehicle a bracket mounted thereon, a lamp-holder pivotally connected to said bracket, a ball bearing between said lamp-holder and bracket, means for adjusting said bearing to take up looseness, a rod, a universal pivotal coupling between said rod and lamp-holder for transmitting rotary movements of the rod about its own axis to the holder, a steering road wheel, a holder for said wheel connected to the vehicle with provision for lateral swinging movement, an arm extending from said holder, and a universal pivotal coupling between said arm and said rod for converting angular movement of the arm into rotary movement of the rod about its own axis.

8. In a motor vehicle a steering wheel, a pivotally mounted holder by which said wheel is carried, and arranged with provision for generally horizontal oscillative movement, an arm projecting from said wheel-holder, a second arm detachably secured upon said arm so as to have the same angular movements as the latter, a lamp-holder pivotally mounted upon a portion of said vehicle and movable oscillatively about an upright axis, and a connecting rod pivotally coupled to the pivot of said lamp-holder and to the outer end of said second-named arm.

9. In a vehicle the combination of a steering road wheel, a pivotally mounted holder on which said wheel is mounted, a lamp-holder pivotally mounted on the vehicle, both holders being movable in a generally horizontal direction on their pivots, and means for transmitting equal degrees of oscillation from said wheel-holder to said lamp-holder, comprising a rod having universal pivotal connection with both holders, the connection with one of said holders being in line with the pivot thereof.

10. The combination, in a propelled vehicle, with a forward steering road wheel and a spring-supported body, of a headlight pivotally mounted on said body on a vertical pivot, and a connecting rod between said wheel and headlight for transmitting lateral angular motion from the former to the latter, said rod being freely variable in length, whereby it permits vertical movements of the vehicle body relatively to the wheels without affecting the angular position of the headlight.

In testimony whereof I have affixed my signature, in presence of two witnesses.

FRANK R. CUNNINGHAM.

Witnesses:
J. H. BROCKWAY,
M. F. TARBELL.